June 4, 1963 R. A. POHLMAN ETAL 3,092,787

CRYSTAL CONTROLLED MULTIPLE FREQUENCY GENERATOR

Filed July 21, 1960

INVENTORS.
RICHARD A. POHLMAN.
BY DONALD F. VOLKMAN.
Alden D. Redfield
Charles M. Hogan.
ATTORNEYS.

3,092,787

CRYSTAL CONTROLLED MULTIPLE FREQUENCY GENERATOR

Richard A. Pohlman and Donald F. Volkman, Cincinnati, Ohio, assignors to Avco Corporation, Cincinnati, Ohio, a corporation of Delaware Filed July 21, 1960, Ser. No. 44,506
3 Claims. (Cl. 331—164)

The present invention relates to crystal oscillators and particularly to a novel crystal controlled multiple frequency generator or frequency shift oscillator.

The principal object of the present invention is to provide a multiple frequency generator in combination with keying networks which select the desired frequency by the application of bias voltages to diodes.

Another object of the invention is to provide a stabilized frequency shift oscillator in which only one crystal and one tube are required.

Figure 1:
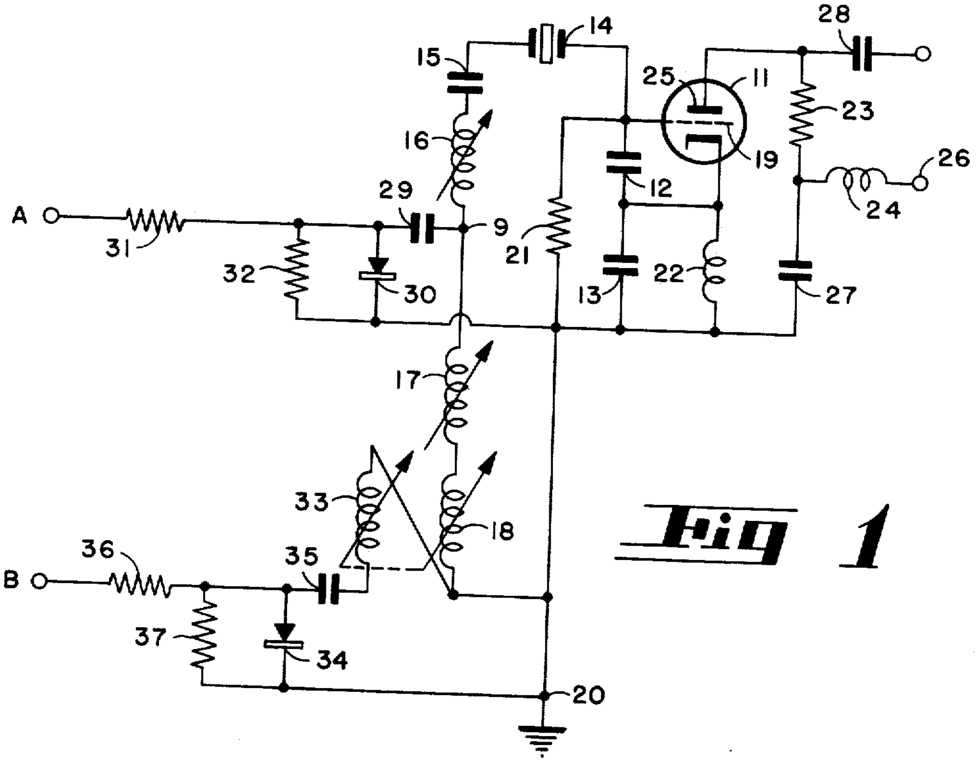
Figure 2:
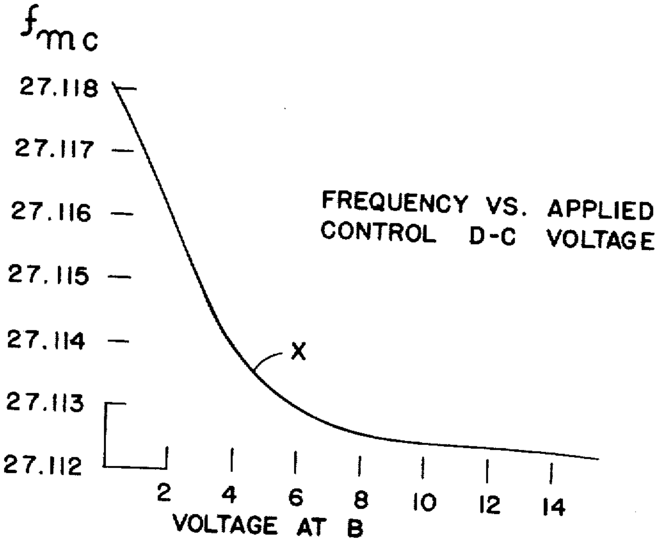

For a better understanding of the present invention together with other objects, advantages and capabilities thereof, reference is made to the following description of the accompanying drawings, in which:

FIG. 1 is a circuit schematic of a preferred form of frequency shift oscillator in accordance with the invention; and FIG. 2 is a graph of output frequencies versus D.C. control voltages applied to terminal B of the FIG. 1 circuit.

Referring now specifically to FIG. 1, there is shown a vacuum tube 11 (one section of a type 6021 tube) arranged in modified Colpitts configuration, with a tank circuit and voltage dividing capacitors 12 (22 micromicrofarads) and 13 (51 micromicrofarads) effectively connected between control electrode and cathode, and between ground and cathode, respectively. The oscillator fundamental resting frequency is determined by a tank circuit comprising a control crystal 14 (type CR–19/u), a capacitor 15 (180 micromicrofarads) and inductances 16 (9 microhenries), 17 (0.5 microhenry) and 18 (3.5 microhenries), all arranged in series between the control electrode 19 and a point of reference potential or ground 20. The following conventional elements are associated with tube 11 in the manner indicated by their functional designations: grid resistor 21 (100,000 ohms) between grid 19 and ground; choke 22 (2 microhenries) between cathode and ground; anode load resistor 23 (2200 ohms) and filter choke 24 (2 microhenries) connected in series between anode 25 and positive terminal 26 of a suitable source of plate current; filter capacitor 27 (0.0015 microfarad) connected between ground and the junction of the elements 23 and 24; and output coupling capacitor 28 (51 micromicrofarads) in series with anode 25.

The circuitry so far described in detail is per se conventional. Improvements provided in accordance with the invention and the inventive combination are now described.

The frequency of the oscillator may be shifted by A and B pulses from pulse generators. The significance of the letters A and B in FIG. 1 is that the terminals there indicated are connected to the sources of such pulses. These pulses are utilized directly to control the conductance of diodes, which in turn are utilized either to decrease or increase the effective inductance of the tank circuit, thereby increasing or decreasing output frequency. That is to say, in the specific embodiment shown, an A pulse causes the oscillator frequency to increase and a B pulse causes it to decrease.

Let us first consider the circuitry controlled by the A pulses. Connected in series between terminal 9 of tank circuit inductor 16 and ground are capacitor 29 (180 micromicrofarads) and a diode 30 (type 1N484) so poled that when the diode becomes conductive point 9 is effectively grounded, thereby shorting out inductors 17 and 18 and increasing the oscillator frequency. In order to render the diode conductive, square pulses of positive polarity are applied to the diode through a network comprising series resistor 31 (10,000 ohms) and resistor 32 (1 megohm) connected in shunt with diode 30.

It has been seen, therefore, that diode 30 is effectively a shorting device for shorting out some of the inductance in the tank circuit.

Let us now consider the arrangements which utilize square pulses B, also of positive polarity, for causing the frequency of the oscillator to decrease. Inductors 18 and 33 are wound in parallel bucking relationship, one terminal of each being grounded. In the absence of a B pulse, inductance 33 is open circuited, but a B pulse is utilized to render diode 34 conductive, thereby placing a capacitor 35 (180 micromicrofarads) in parallel with inductor 33, loading the secondary 33, and reflecting impedance into the primary 18. This impedance, which is equivalent to an increase in the inductance of element 18, causes the frequency of the oscillator to decrease. Accordingly, capacitor 35 and diode 34 (1N484) are connected in series between inductor 33 and the ground point 20. B pulses are applied to diode 34 to render it conductive through a network comprising series resistance 36 (10,000 ohms) and 37 (1 megohm) in shunt with diode 34.

The resistance networks 31, 32 and 36, 37 decouple the pulse generators from the oscillator tank circuit. The input pulses at A and B may be of short or long duration. The desired frequencies can also be obtained by applying D.C. voltages at A or B and switching those voltages as desired.

Inductance of the bifilar windings 18 and 33 is adjusted for resting frequency with no pulses present at A and B. When a "one" pulse of a binary system is applied at A, the output frequency is increased. When a zero pulse is applied at B, the output frequency is decreased.

The input at points A and B may of course also be sinusoidal.

In what has been written so far the circuit operation has been described in terms of steps. We have considered, for example, the events which occur when diode 30 is non-conductive or fully conductive and those occurring when diode 34 is non-conductive or fully conductive.

As is indicated by reference to FIG. 2, which shows direct current voltage at B, plotted as abscissae on a framework of Cartesian coordinates against output frequencies in megacycles as ordinates, the curve X shows that the oscillator in accordance with the invention can provide continuous variation in frequency within a predetermined range, dependent on the magnitude of the bias applied to the diode 34 and the saturation characteristics of such diode.

It will be understood that the specific parameters herein mentioned are illustrative and that the invention is not limited to parameters directed to such specific values.

From the foregoing, it will be understood that the invention provides a stabilized signal generator having a normal crystal controlled reference frequency. Frequency offsets are introduced by D.C. biasing a diode 30 into conductivity to short out inductance or a diode 34 into conductivity to reflect inductance into the frequency determining or tank circuit of the crystal controlled oscillator, to accomplish resistance variation in steps of any desired duration or amount, dependent on the range of control of the crystal 14. In a secondary aspect, the diode may be regarded as a resistive element of the over-all frequency determining parameters of the tank circuit, and such resistive parameter may be varied with continuity by a suitable variation of the D.C. bias supplied to the diodes, as indicated in FIG. 2.

Having disclosed our invention we claim:

1. A crystal controlled oscillator comprising a vacuum tube having at least anode, cathode and control electrodes, voltage dividing capacitors between said cathode and control electrode and between said cathode and a point of reference potential, a tank circuit comprising a control crystal, a capacitor and a plurality of inductors connected in series between said control electrode and said point of reference potential, means including a first diode for shorting out at least one of said inductors, and means including a second diode for reflecting additional inductance into at least one of said inductors, each of said diodes having a cathode connected to said point of reference potential.

2. A crystal controlled oscillator in accordance with claim 2 in which the means for shorting out an inductor comprises a series combination of capacitance and said first diode connected between the junction of two of said inductors and said point of reference potential, together with a source of biasing pulses and a series resistance-shunt resistance network for applying said pulses to said diode.

3. A crystal controlled oscillator in accordance with claim 3 in which the means for reflecting inductance comprises a winding bifilarly related to one of said inductors and a series combination of capacitance and said second diode connected in series with said winding, a second source of biasing pulses and a second series resistance-shunt resistance network for applying said pulses to the last-mentioned diode.

References Cited in the file of this patent

UNITED STATES PATENTS 2,925,562 Firestone ---------------- Feb. 16, 1960

FOREIGN PATENTS 686,979 Great Britain -------------- Feb. 4, 1953

UNITED STATES PATENT OFFICE

CERTIFICATE OF CORRECTION

Patent No. 3,092,787 June 4, 1963

Richard A. Pohlman et al.

It is hereby certified that error appears in the above numbered patent requiring correction and that the said Letters Patent should read as corrected below.

Column 3, line 17, for the claim reference numeral "2" read -- 1 --; column 4, line 5, for the claim reference numeral "3" read -- 2 --.

Signed and sealed this 10th day of December 1963.

(SEAL)
Attest:

ERNEST W. SWIDER
Attesting Officer

EDWIN L. REYNOLDS
Acting Commissioner of Patents